United States Patent [19]

Nelson

[11] Patent Number: 5,360,490
[45] Date of Patent: Nov. 1, 1994

[54] RADIANT EMISSION AND THERMOPHOTOVOLTAIC TECHNOLOGY

[75] Inventor: Robert E. Nelson, Weston, Mass.

[73] Assignee: Gas Research Institute, Chicago, Ill.

[21] Appl. No.: 62,897

[22] Filed: May 18, 1993

[51] Int. Cl.$^5$ .................................... H01L 31/058
[52] U.S. Cl. .................... 136/253; 431/100; 431/328; 431/329
[58] Field of Search ............... 136/253; 431/328, 100, 431/329

[56] References Cited

U.S. PATENT DOCUMENTS

| | | | |
|---|---|---|---|
| 3,472,601 | 10/1965 | Yamamura et al. | 431/328 |
| 4,673,349 | 6/1987 | Abe et al. | 431/328 |
| 4,746,287 | 5/1988 | Lannutti | 431/328 |
| 5,137,583 | 8/1992 | Parent et al. | 136/253 |

OTHER PUBLICATIONS

Ko, "Preform Fiber Architecture for Ceramic-Matrix Composites," Ceramic Bulletin, vol. 68, No. 2, 1989, pp. 401–414.

*Primary Examiner*—Aaron Weisstuch
*Attorney, Agent, or Firm*—Fish & Richardson

[57] ABSTRACT

A radiant emission system includes ceramic fiber support structure and an array of emitter fiber members that are mechanically interlocked with and project outwardly from a surface of the support structure with the free ends of the emitter members spaced from one another and from the support structure, and thermal excitation structure for flowing fuel through the passages and establishing a combustion condition at the surface to heat the emitter fiber members to thermally emissive temperature.

33 Claims, 2 Drawing Sheets

RADIANT EMISSION AND THERMOPHOTOVOLTAIC TECHNOLOGY

This invention relates to emission technology and more particularly to emission systems of the fuel burner type for providing radiant energy.

BACKGROUND OF THE INVENTION

A variety of radiant emission systems are known, including for example, mantle systems and porous matrix burner systems. Porous matrix burner systems provide large, mechanically durable emitter structures, but the dense fiber mat tends to prevent generation of the high fiber temperatures that are frequently necessary to obtain selective emission such as is desirable for thermophotovoltaic applications, for example. Also, system constituents such as ceramic adhesives may tend to degrade burner performance as well as limiting emission system operating temperatures and emission system life. It is recognized that cordierite ceramic substrates of the type shown in Parent U.S. Pat. No. 5,137,583 are costly and the fiber insertion process is tedious.

SUMMARY OF THE INVENTION

In accordance with one aspect of the invention there is provided an improved radiation emission system that includes a ceramic fiber support structure with a plurality of flow passages therethrough (that are preferably formed by fugitive fibers) and an array of ceramic fiber emitter members that are attached in interlocking relation to fibers of the support structure and are in adjacent relation to the flow passages and project outwardly from a surface of the support structure with the free ends of the emitter members spaced from one another and from the ceramic fiber support structure (in the nature of cut pile or tufted rug structure in particular embodiments), and thermal excitation structure for flowing fuel through the passages and establishing a combustion condition at the ceramic fiber surface to heat the emitter members to thermally emissive temperature. In preferred embodiments, the ceramic fiber emitter members may be selective emitters of a rare earth metal oxide material such as ytterbia, erbia, terbia, or holmia; visible radiation emitters of a rare earth metal oxide material such as thoria-ceria, or ytterbia-ceria; broad band highly emissive radiation emitters of a perovskite material such as lanthanum chromite, magnesium chromite, neodymia, praseodymia, or lanthanum nickel oxide; or gray body emitters of a material such as alumina, stabilized zirconia, or calcia.

The ceramic fiber support structure may take various forms (planar, curved, etc.) The flow passages in the ceramic fiber support structure may be created in various manners, for example, by voids in precursor materials or by selective disintegration of organic material. The ceramic fiber emitter members may be of various configuration—loop type, elementary cantilever type, etc; and their density, cross-sectional dimension, length, etc. may be functions of thermal excitation aspects such as combustion zone configuration, fuel, oxidant, and flame type, e.g., premix or diffusion flame.

In particular embodiments, the ceramic fiber emitter members are multi-filament ceramic fiber bundles that have cross-sectional dimensions in the range of 0.035–0.2 millimeter; the ceramic fiber support member has a generally planar surface from which the emitter fiber members extend; and the free ends of the emitter fiber members are disposed less than about one centimeter from that surface. In one particular embodiment, the elongated emitter fibers extend generally perpendicularly from the planar surface at a density of at least ten per square centimeter of support surface.

In particular embodiments, the thermal excitation structure includes structure for supplying fuel and oxidant to the support member for establishing a diffusion flame condition at the support surface. In such embodiments, the emitters may be of various types including cantilever element type and loop type, and may be disposed perpendicularly to or at an angle to the support surface which may be planar or curved for example.

In accordance with another aspect of the invention there is provided a process of manufacturing and operating a radiant emission system that includes the steps of providing support structure of organic fiber material imbibed with a nitrate compound, the support structure having a support surface; attaching a multiplicity of elongated members of organic material imbibed with a nitrate compound to the support structure fibers in mechanically interlocked relation and projecting outwardly from the support surface; heating the fibrous support structure and the elongated members to convert the nitrate compounds to ceramic materials with concurrent decomposition and removal of the organic material so that ceramic replicas of the fibrous support structure and elongated members remain, the replica emitter members being in spaced array, mechanically interlocked with, and extending outwardly from the surface with end portions of the emitter members spaced from one another and from the support structure; and thermally exciting the emitter members by establishing a combustion condition adjacent the surface to heat the emitter members to thermally emissive temperature.

Preferably, the substrate is fabricated out of imbibed rayon yarn. A variety of conventional textile knitting, weaving, non-woven, and braiding processes may be employed as appropriate to produce three-dimensional precursor substrates. The rayon yarn may be imbibed with low cost metal nitrates so that the terminal ceramic is alumina, silica, mullite, cordierite, or the like. The substrate, while in the green (imbibed rayon) state, serves as support material for the next step in the process. The fibers, in the form of imbibed catalytically active or optically active nitrate precursor rayon yarn, are interlocked with the fibers of the substrate in the nature of cut pile or uncut looped pile. At the same time and if required, some untreated organic monofilament may also be incorporated to increase substrate porosity inasmuch as this fugitive material disappears during thermal processing and leaves behind gas flow channels. The consolidated imbibed precursor is then thermally processed in one step. This procedure may be done in a continuous belt furnace. The entire process can be automated, and major mechanical components can be selected from already-developed components from the textile/rug industries.

In preferred embodiments, the nitrate compounds include materials selected from the group consisting of aluminum, calcium, cerium, erbium, holmium, lanthanum, magnesium, neodymium, nickel, praseodymium, terbium, thorium, ytterbium, and zirconium; the emitter members are thermally excited by establishing a combustion energy density of at least twenty watts per square centimeter of the surface area of the support structure; and the emission system produced by the process has a radiative efficiency of at least thirty percent. In a particular embodiment, the emitter members are thermally excited by flowing fuel through passages that have a flow area of about one square millimeter each and that are disposed at a density of at least two per square centimeter in the support structure; and in another embodiment, the emitter members are thermally excited by establishing a diffusion flame condition adjacent the support structure surface.

The invention provides efficient, mechanically durable emission systems that may be of large area and/or provide substantial power densities, and have numerous applications, including thermovoltaic applications and the like. The insertion of precursor emitter fibers into the support structure is simplified and concurrent thermal processing of different ceramic precursers of the support structure and the emitter members provide the ceramic replica structures.

BRIEF DESCRIPTION OF THE DRAWINGS

Other features and advantages of the invention will be seen as the following description of particular embodiments progresses, in conjunction with the drawings, in which.

DESCRIPTION OF PARTICULAR EMBODIMENTS

Figure 1:
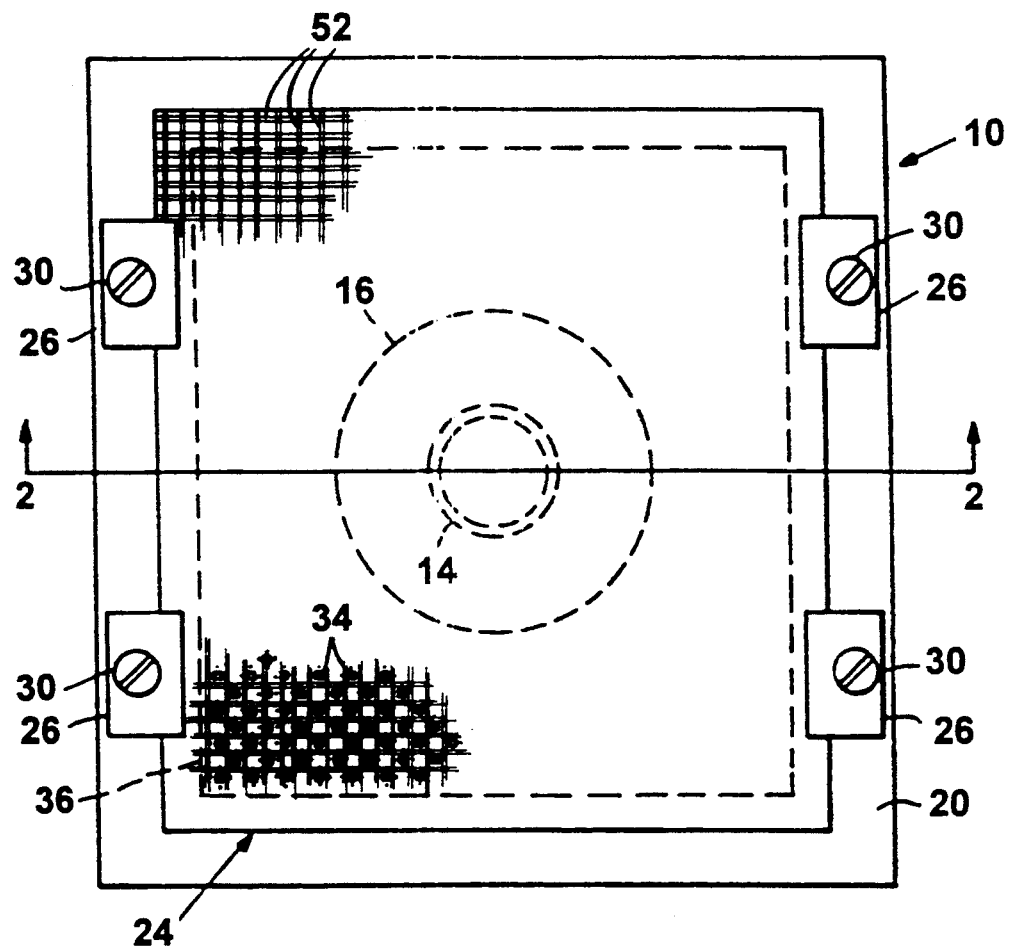
FIG. 1 is a diagrammatic plan view of an emission system in accordance with the invention.
Figure 2:
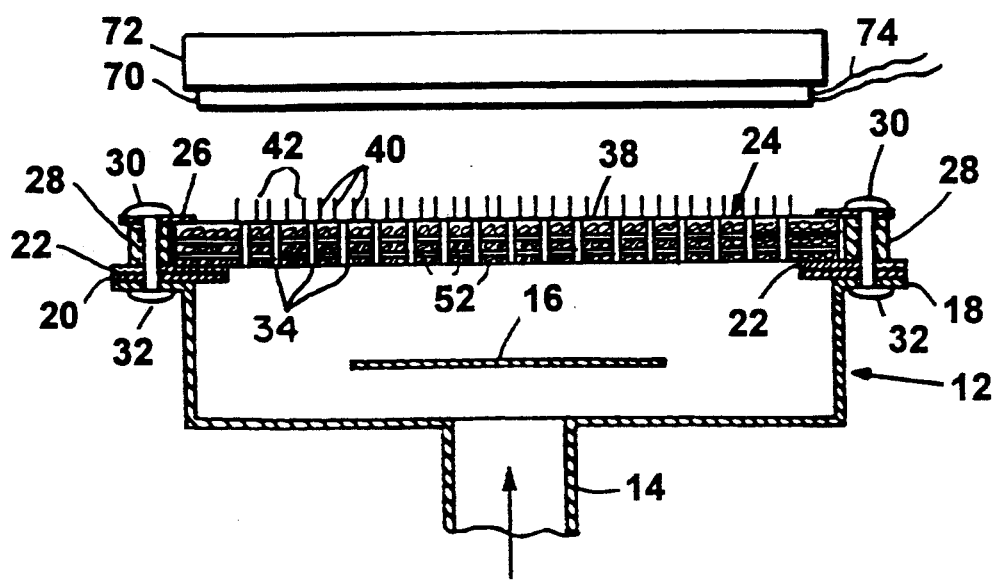
FIG. 2 is a sectional view of the emission system taken along the line 2—2 of FIG. 1.

Shown in FIGS. 1 and 2 is emission system 10 that includes stainless steel chamber 12 (about fifteen centimeters wide, fifteen centimeters long, and five centimeters deep) with fuel conduit 14. Diffuser baffle 16 is disposed in chamber 12 in front of the outlet of conduit 14. Chamber 12 has flange 18 on which is mounted stainless steel apertured plate 20, silica-alumina gasket 22, and woven alumina fiber support member 24. Clamp plates 26, that are secured to flange 18 with internally threaded posts 28 and fasteners 30, 32, seat alumina fiber support member 24 in sealed relation on the top of chamber 12.

Alumina fiber support 24 has a thickness of about one centimeter and is about twelve centimeters wide and twelve centimeters long. Formed in support 24 is an array of parallel fuel passages 34 (each of about one square millimeter flow area) that are spaced about 0.4 centimeter apart in regular diamond-like array at a density of about seven passages per square centimeter over an active area (indicated by dotted line 36) that is about ten centimeters wide and about ten centimeters long. Upstanding elongated cantilever-type ytterbia emitter elements 40 are disposed in regular array at a density of about fifty per square centimeter over active area 36. Four ytterbia elements 40 are disposed in surrounding array and adjacent (within about one millimeter) to each fuel passage 34. Each emitter element 40 is in the form of elongated cantilever-type loops of ytterbia filaments, the tips 42 of which are about eight millimeters from front surface 38 of support 24.

Figure 3:
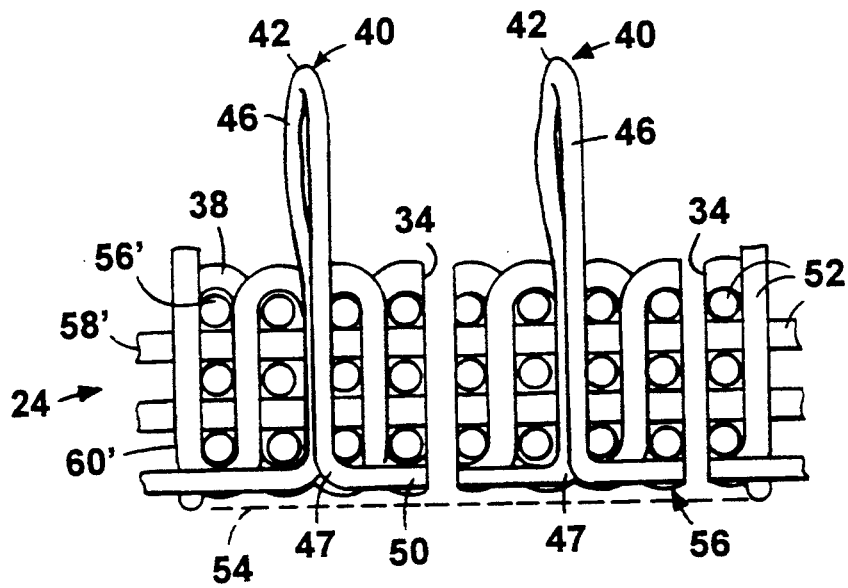
FIG. 3 is an enlarged diagrammatic view of a portion of the emission system shown in FIG. 1.

The emitters 40 are of continuous ytterbia multi-filament fibers in the form of multi-filament strands or bundles 46 and, as indicated in FIG. 3, include cantilever-type loop portions that are upstanding from front surface 38. Intermediate portions 47 of the strands 46 extend through support 24 parallel to fuel passages 34 to connecting portions 50 and are mechanically interlocked with alumina fiber 52. Porosity of support 24 may be adjusted by alumina cement 54 at the rear surface 56 of support 24. Cross-sectional dimensions of individual fibers of a ytterbia strand 46 are in the range of five to ten micrometers and each fiber strand 46 has a cross-sectional dimension of about 0.2 millimeter.

Figure 4:
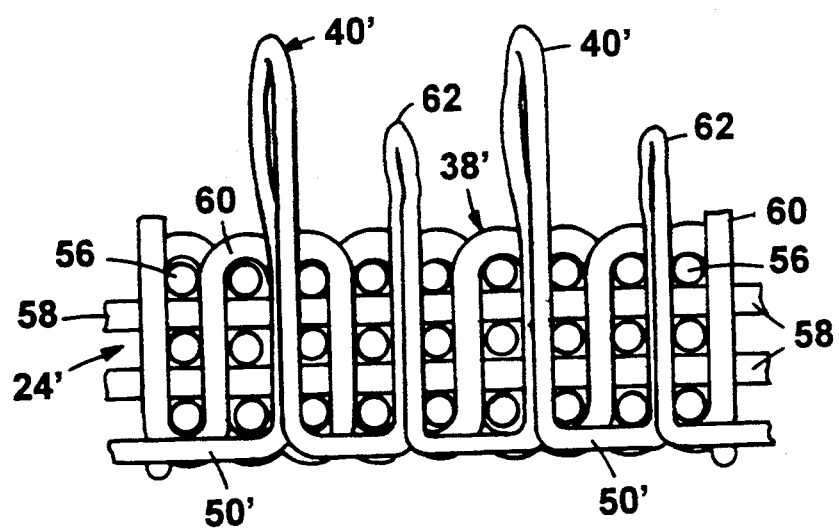
FIG. 4 is an enlarged diagrammatic view of a portion of an imbibed fabric assembly precursor to the FIG. 3 structure.

With reference to FIG. 4, an alumina-ytterbia emitter assembly is made as follows. A three dimensional woven substrate 24' includes undyed 2000 denier rayon yarn with warp yarn 56, weft yarns 58, and interlock yarns 60. Although only three warp layers are shown in the diagrams of FIGS. 3 and 4, a typical emitter assembly of this type would have thirty-forty layers. While several ceramics are available for use as substrate such as calcia, magnesia, stabilized zirconia, etc., alumina is employed in this embodiment for its mechanical strength and low cost. For a 0.13 square meter square sample of substrate 24', four liters of an aluminum nitrate imbibing solution is prepared. A 1.5 molar solution is prepared from A.C.S. grade $Al(NO_3)_3$ $9H_2O$ (Formula Weight—375.13). The rayon substrate 24' is immersed and agitated for thirty minutes at room temperature in the aforementioned imbibing solution. The saturated substrate 24' is removed from the bath and allowed to drain. Excess imbibing solution is removed by squeezing substrate 24' between two rubber-covered parallel stainless steel cylinders about five centimeters in diameter and about fifty centimeters long. A sleeve of compliant rubber about two millimeters thick is stretched over the metallic rollers. The two cylinders are supported so that an adjustable spring tension may be applied to keep the two cylinders together. The two cylinder shafts are geared together, and one cylinder is powered by a slow-speed motor system. After the substrate 24' is squeezed by the aforementioned roller system, further excess imbibing solution is removed by spinning substrate 24' in the spin basket of a conventional commercial washing machine. It is helpful to spin multiple substrates 24' equispaced around the periphery of the spin basket for balancing purposes. A twenty minute spin time may be employed. After spinning, imbibed substrate 24' is stretched flat and placed on a nonporous flat surface and allowed to dry.

The emissive properties of a radiant burner structure which includes the emitter assembly are governed by the optical properties of the fibers 40 which extend above the substrate 24 and receive thermal energy from the flame. In this example a selective (narrow-band) emitter is employed that radiates at a wavelength of about one micrometer, which is near the peak responsivity wavelength of a crystalline silicon photoconverter. A network of ytterbia fibers 40 serves as the emitter component of a thermophotovoltaic energy converter based on silicon photovoltaic cells. Many other emission choices are available. Erbia fibers could serve as an illuminator of germanium cells in an alternative thermophotovoltaic system. Stabilized zirconia fibers could serve as a high-temperature, gray-body, emissive source.

An imbibing solution is prepared using $Yb(NO_3)_3$, $5H_2O$ (Formula Weight=449.13) 99.9% pure (metal basis). A 1.27 molar solution is made by dissolving the appropriate amount of the nitrate in distilled water. A 1.5 liter quantity is convenient. About 4.5 grams of 300 denier (50 fibrils of six denier per fibril) continuous filament rayon yarn (eight twists per inch) is wound onto a nylon spool about three centimeters in diameter and about eight centimeters long. The spooled rayon yarn is immersed in the imbibing solution at room temperature and agitated for about twenty minutes. After removal from the imbibing solution and after allowing excess liquid to drain, the yarn spool is attached to the spindle of a universal motor and spun at about 4000 rpm to remove centrifugally the excess liquid from the buried layers of rayon yarn. The spools are spun for about fifteen minutes, removed from the spindles, and allowed to air dry at room temperature. Four spools of imbibed rayon yarn 40' may be prepared for this emitter assembly.

The imbibed rayon yarn 40' is inserted into the substrate 24' with the aid of a modified knitting machine needle. A conventional latch needle without the latch is employed, in effect, a small diameter crochet hook. The needle is inserted from the surface 38' side of the substrate 24' and emerged from the plenum side. When the hook of the needle is on the plenum side, a fiber bundle 40' consisting of four imbibed 300 denier rayon yarns (200 fibrils total for a total denier of 1200) is picked up by the needle's hook and pulled through the substrate 24', and the vertical pull continues until a loop extending about 2.5 centimeters above the substrate surface 38' is formed. The needle's hook is then released from the fiber bundle and reinserted into the substrate at an adjacent location with a spacing such that three loops per centimeter can be pulled. When the needle reemerges on the plenum side, the four yarn bundle is again picked up by the hook and pulled through the substrate to the same height as the earlier loop. In the process, the yarn bundles are pulled snugly against the plenum side. The looping process is continued until the active area of the substrate is filled with loops at the aforementioned density of about ten loops per square centimeter.

Burner porosity in this structure is controlled by introducing a fugitive material that volatilizes during the thermal treatment and leaves behind parallel channels through which the fuel and air may flow. A convenient method of incorporating this feature relies on nylon monofilament 62. 80 pound test monofilament nylon line 62 with a diameter of about 0.9 millimeter may be used. Loops of this filament 62 are installed in the same manner as the imbibed rayon yarn 40' with the same density of about three loops per centimeter. Loop height and the degree of closeness to the plenum side are not important with the nylon monofilament 62 since this material is sacrificed during the thermal processing.

The imbibed fiber support 24' with imbibed yarn loops 40' is then subjected to a firing procedure to convert the ytterbium nitrate imbibed cellulosic yarn into densified ytterbia emitter members and the aluminum nitrate imbibed substrate fibers 56, 58, 60 into a densified alumina structure, as follows. The completed structure containing the imbibed substrate 24', the imbibed rayon yarn 40' and the nylon monofilaments 62 is suspended horizontally with the imbibed rayon loops 40' hanging downward. The structure is suspended on an array of alumina posts about 1.5 millimeter in diameter and about ten centimeters long. These posts in turn are supported by slabs of extruded cordierite (Celcor) (one centimeter thick with a pore density of forty per centimeter). Fifteen ×twelve centimeter slabs of this extrusion are used to cover the bottom surface of the retort. Rows and columns of 1.5 centimeters diameter alumina posts are inserted into the Celcor with a regular spacing of about twenty-five millimeters. The textile structure 24' is propped up on the nailbed array with the imbibed rayon loops 40' hanging down.

The support 24' with the threaded yarn loops 40' is placed in a retort so that support 24' is horizontal and the loops extend downwardly. The retort (with support 24' and inserted yarn loops 40') is placed in an Electra Products furnace Model 121925, Series 2100R, and processed as follows. At ambient temperature (about 25° C.) the retort is evacuated with a mechanical vacuum pump and backfilled with nitrogen, and then nitrogen is flowed through the retort is at a flow rate of about 200 cubic centimeters per minute. With this inert atmosphere in the retort, the furnace temperature is increased at a rate of about 400° C. per hour. The support fibers 56, 58, 60 and the emitter fibers 40' undergo "nitrate burn " at about 130° C. At that time, the color of the fibers change rapidly from white to golden tan. Heating continues to increase at a rate of 14° C. per minute to a temperature of about 440° C. which produces a retort temperature of about 320° C. During this interval, the color of the fibers 40' continuously changes from golden tan to dark brown or black with modest shrinkage (about ten percent) of the support, fugitive, and emitter fibers, indicating additional decomposition of the organic fiber material. Air is added to the nitrogen flow rate through the retort of about 2.34 liters per minute to provide a retort atmosphere of about five percent oxygen while the retort temperature is held at about 320° C. for about one and one half hours sufficient to permit the fibers to turn from black to light gray to white. During this soaking interval, the remaining carbon is oxidized and driven off, destroying the fugitive fibers 62 and leaving gas flow passages 34, and each dimension of the support and emitter fibers shrinks to about $\frac{1}{3}$ its original dimension so that the tips 42 of the yarn loops 40 extend about eight millimeters above support surface 38. At the end of the soaking interval, the furnace temperature is increased from about 380° C. to about 950° C. over about one hundred minutes (a ramp rate of about 5° C. per minute) to a final retort temperature of about 900° C. and an oxygen content in the retort of about eighteen percent. The furnace heater is then turned off and the furnace allowed to cool to ambient temperature.

The emitter subassembly is removed from the retort and sintered at 1400° C. for one hour in a modified Lindberg furnace. Optionally, alumina cement 54 (Ceramabond 569) (FIG. 3) is applied to secure connecting portions 50 of the ceramic fiber loops 40 at the rear surface of support 24 and to block excess channels of support 24 that are not to be fuel passages 34.

The resulting woven alumina fibers 56', 58', 60' and the cantilevered, loop-type ytterbia emitter elements 40, in visual appearance, substantially retain characteristic physical textile attributes of their precursor rayon yarns, although they are substantially reduced in dimension. The ytterbia emitters have relatively high density, have flexibility and have minimal defects (flaws) in their microstructures. The tips 42 may be retained, or in another embodiment, the tips may be removed (either before or after thermal denitration) to provide an emitter array of the 'cut-pile' type, in which multiple upstanding ytterbia fibers have free ends spaced from support 24.

The processed alumina-ytterbia emitter subassembly is then assembled to a suitable fuel chamber structure, for example, structure 12 shown in FIGS. 1 and 2, and thermally energized by establishing an air-propane flame at surface 38 with an adiabatic flame temperature of about 2,200K and maintained so that the maximum flame temperature is in the vicinity of the tips 42 of the upstanding ytterbia yarn loops 40 (slightly less than one centimeter from support surface 38). The spectral irradiance profile of the emission system has a radiation peak at about 985 nanometers with half intensity points at about 890 nanometers and 1050 nanometers, respectively, and the radiation peak of the emission system has a full width at half maximum of about 150 nanometers. In a thermophotovoltaic system, a silicon photocell array 70 with output leads 74 is mounted on support 72 and disposed in spaced juxtaposition with the emitter array, as indicated in FIG. 2. In another embodiment, an erbia emitter array is used in juxtaposition with a germanium photocell array.

While particular embodiments of the invention have been shown and described, various modifications will be apparent to those skilled in the art, and therefore, it is not intended that the invention be limited to the disclosed embodiments or to details thereof, and departures may be made therefrom within the spirit and scope of the invention.

What is claimed is:

1. A radiant emission system comprising
    a support structure having an array of ceramic fibers and a surface,
    a multiplicity of elongated emitter fibers, said emitter fibers being in spaced mechanically interlocked array with said array of ceramic fibers and extending outwardly from said surface with end portions of said emitter fibers spaced from one another and from said support structure, and thermal excitation structure for establishing a combustion condition adjacent said surface to heat said emitter fibers to thermally emissive temperature.

2. The system of claim 1 wherein said emitter fibers are of ceramic material.

3. The system of claim 1 wherein said emitter fibers are selected from the group of selective emitters of rare earth metal oxide material, visible radiation emitters of rare earth metal oxide material, broad band highly emissive radiation emitters of perovskite material, and gray body emitter material.

4. The system of claim 1 where said ceramic fibers and said emitter fibers are of materials selected from the group consisting of alumina, calcia, ceria, erbia, holmia, lanthanum chromite, lanthanum nickel oxide, magnesium chromite, neodymia, praseodymia, terbia, thoria, ytterbia, and stabilized zirconia.

5. The system of claim 1 wherein said emitter fibers are composed of multi-filament ceramic bundles that have cross-sectional dimensions in the range of 0.035–0.2 millimeter.

6. The system of claim 1 wherein said surface of said support member is generally planar, and said array of ceramic fibers are disposed in a conventional textile fiber array selected from the group consisting of knitted, woven, non woven, and braided arrangements.

7. The system of claim 1 wherein the tips of said emitter fibers are disposed less than about one centimeter from said surface.

8. The system of claim 1 wherein said emitter fibers extend generally perpendicularly outwardly from said surface.

9. The system of claim 1 and further including a photocell array in spaced juxtaposition to said support structure to provide a thermophotovoltaic system.

10. The system of claim 9 wherein said emitter fibers are of the ytterbia type and said photocell array is of the silicon type.

11. The system of claim 9 wherein said emitter fibers are of the erbia type and said photocell array is of the germanium type.

12. The system of claim 1 wherein said emitter fibers are disposed on said support structure at a density of at least ten per square centimeter of said support surface.

13. The system of claim 1 wherein said support structure has a plurality of flow passages that extend therethrough to a plurality of ports in said surface.

14. The system of claim 1 wherein said emitter fibers are of loop-type configuration.

15. The system of claim 14 wherein said emitter fibers are disposed on said support structure at a density of at least ten per square centimeter of said support surface, said support structure has a plurality of flow passages that extend therethrough to a plurality of ports in said surface, and said ports are disposed on said support structure at a density of at least two per square centimeter of said support surface.

16. The system of claim 15 wherein each said port in said surface has a flow area of about one square millimeter.

17. The system of claim 16 wherein said ceramic fibers and said emitter fibers are of materials selected from the group consisting of alumina, calcia, ceria, erbia, holmia, lanthanum chromite, lanthanum nickel oxide, magnesium chromite, neodymia, praseodymia, terbia, thoria, ytterbia, and stabilized zirconia.

18. The system of claim 17 wherein said emitter fibers are composed of multi-filament bundles that have cross-sectional dimensions in the range of 0.035–0.2 millimeter.

19. The system of claim 18 wherein said surface of said support member is planar, said emitter fibers extend generally perpendicularly outwardly from said surface, and the tips of said emitter fibers are disposed less than about one centimeter from said surface, and said array of ceramic fibers are disposed in a conventional textile fiber array selected from the group consisting of knitted, woven, non-woven, and braided arrangements.

20. The system of claim 19 and further including a photocell array in spaced juxtaposition to said support structure to provide a thermophotovoltaic system.

21. The system of claim 20 wherein there are at least twice as many emitter fibers as said ports in said surface.

22. A process of manufacturing and operating a radiant emission system comprising the steps of
    providing a support structure having a surface defined by an array of fibers of organic material imbibed with a nitrate compound,
    disposing a multiplicity of elongated members of organic material imbibed with a nitrate compound in spaced array, said members being mechanically interlocked with and projecting outwardly from said surface of said support structure,
    heating said support structure and said elongated members to convert said nitrate compounds to ceramic materials with concurrent decomposition and removal of said organic material, said ceramic members being replicas of said array of fibers and said elongated members of organic material, said ceramic emitter members being in spaced array and extending outwardly from said surface of said ceramic fiber support structure with end portions of said emitter members spaced from one another and from said support structure, and thermally exciting said emitter members by establishing a combustion condition adjacent said surface to heat said emitter members to thermally emissive temperature.

23. The process of claim 22 wherein said nitrate compound includes a material selected from the group consisting of aluminum, calcium, cerium, erbium, holmium, lanthanum, magnesium, neodymium, nickel, praseodymium, terbium, thorium, ytterbium, and stabilized zirconium.

24. The process of claim 23 wherein said support structure includes passage structure, and said emitter members are thermally excited by flowing fuel through said passage structure and igniting said fuel to establish a combustion condition adjacent said support structure surface.

25. The process of claim 24 and further including the step of inserting fibers of fugitive organic material in said array of fibers of organic material to form said passage structure by thermal decomposition of said fugitive material during said heating step.

26. The process of claim 22 wherein said support structure includes a multi-layer woven array of said fibers and said elongated members extend through said woven array from one side to said surface of said support structure.

27. The process of claim 22 wherein said emitter members are thermally excited by establishing a combustion energy density of at least twenty watts per square centimeter of the area of said surface of said support structure.

28. The process of claim 22 wherein said support structure includes an array of through passages.

29. The process of claim 28 and further including the step of inserting fibers of fugitive organic material in said array of fibers of organic material to form said through passage structure by thermal decomposition of said fugitive material during said heating step.

30. The process of claim 29 wherein said support structure includes a multi-layer woven array of said fibers and said elongated members extend through said woven array from one side to said surface of said support structure.

31. The process of claim 30 wherein said emitter members are selected from the group of selective emitters of rare earth metal oxide material, visible radiation emitters of rare earth metal oxide material, broad band radiation emitters of perovskite material, and gray body emitter material.

32. The process of claim 31 wherein said emitter members are thermally excited by establishing a combustion energy density of at least twenty watts per square centimeter of the area of said surface of said support structure, and said radiant emission system has a radiative efficiency of at least thirty percent.

33. The process of claim 32 wherein said emitter members are thermally excited by flowing fuel through said passage structure and igniting said fuel to establish a combustion condition adjacent said support structure surface.

* * * * *